UNITED STATES PATENT OFFICE.

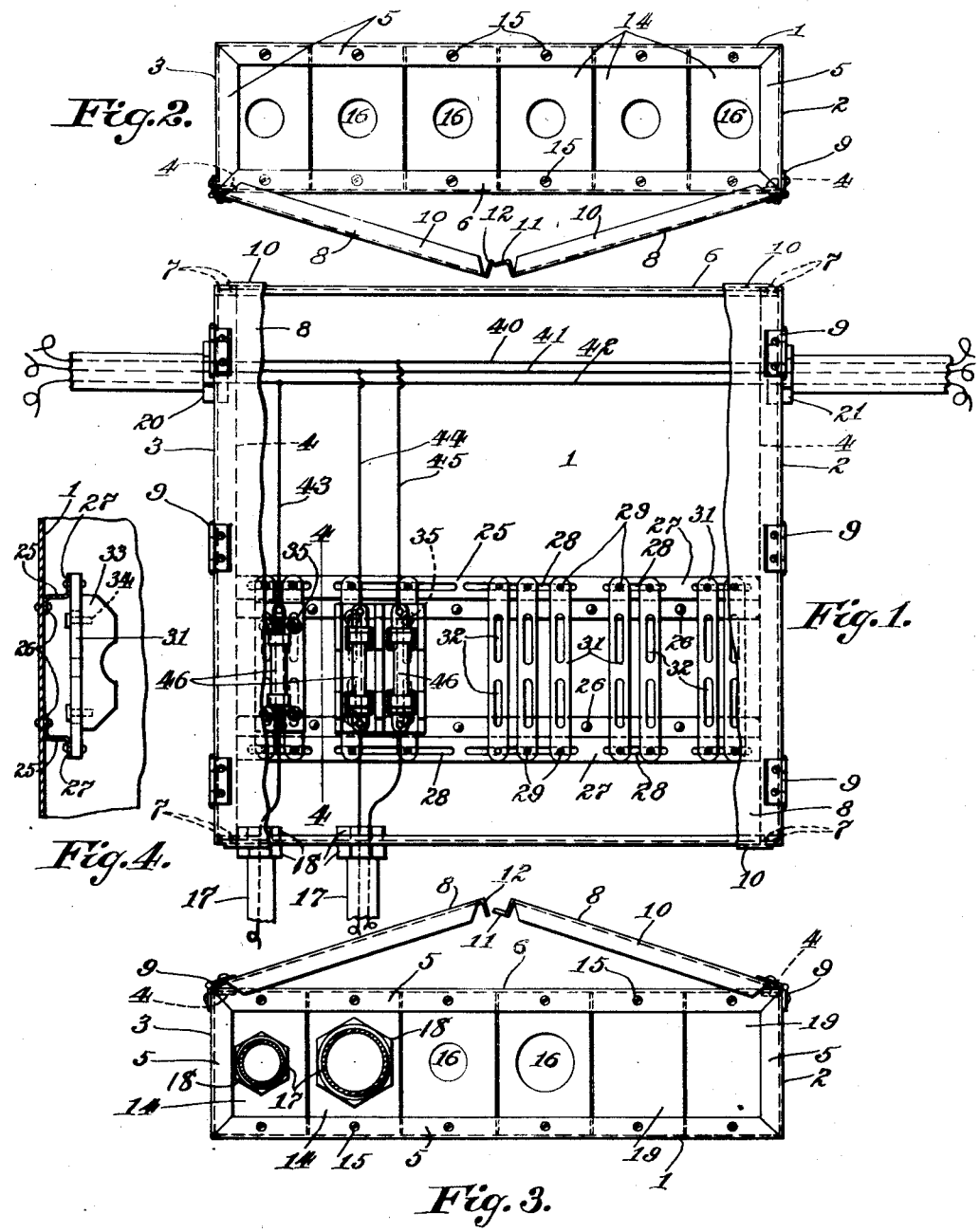

HECTOR H. BROWN, OF BALTIMORE, MARYLAND, ASSIGNOR TO RIGGS, DISTLER & STRINGER, INCORPORATED, A CORPORATION OF MARYLAND.

CUT-OUT BOX.

1,355,886.  Specification of Letters Patent.  Patented Oct. 19, 1920.

Application filed May 31, 1919. Serial No. 300,947.

*To all whom it may concern:*

Be it known that I, HECTOR H. BROWN, a citizen of the United States of America, residing in the city of Baltimore, State of Maryland, have invented certain new and useful Improvements in Cut-Out Boxes, of which the following is a specification.

This invention relates to an improved safety box or electrical appliance otherwise known as a wall box or junction for cut-outs, switches and the like.

The fire and insurance regulations require that fuses and switches in connection with the wiring system of any large building be protected or rather that the surrounding structure be protected from exposure to fire which may originate from the destruction of fuses or arcing at the switches, etc., by means of fire-proof boxes or cabinets. As a matter of economy, as many of these switches and cut-outs or fuses are grouped at a single point as is found feasible, so that where the electrical system in a building is at all extensive, a safety box or cabinet is the point of juncture or meeting point of a considerable number of branches, wires and mains. The wires for further protection against fire are inclosed in metal pipes known as conduits. From time to time the capacity of the various lines and consequently the size and number of wires and hence the size of the pipes or conduits entering the wall or cabinet must be changed. As a reasonably tight joint must be made with the pipes in the cabinet, there must be holes in the cabinet corresponding to the sizes of the pipes. After the cabinet is installed and wired, it is not feasible to remove it in order to cut openings to change the size of the pipes or to introduce new ones. Ordinarily this is done as necessary, cutting the metal with a cold chisel when the box is in place. Under these circumstances the box and the surrounding plastering are more or less disfigured and a good deal of time is wasted. One of the objects of the invention is to avoid cutting, drilling or punching the box when in position.

To this end I have provided a wall box or cabinet made with a number of removable plates through which the conduits are passed. Each box as sold preferably includes a number of plates in excess of those required to complete the box, the holes in the various plates, particularly the extra ones, being of various sizes greater and smaller than the size of opening ordinarily used. Whenever it is necessary to change the size of conduit, the plate through which it is passed is removed and another one substituted having an opening to receive the new conduit by which the one removed is to be replaced, so that no cutting or injury of the box or the wall is necessary.

Another feature of the invention is also intended to save time by making unnecessary cutting, punching and dismembering of the box when changes in the electric system are to be made. As already pointed out the principal function of such boxes or cabinets is to inclose the fuses and protect the surrounding structure from fire incident to the burning of the fuses or from short circuit. Various sized fuses of various makes and types are used and the sizes vary with the current strength in the different circuits, so that where changes in the system are made it is often necessary to change the fuses, and as the cut-out blocks are of correspondingly different size and structure, it is likewise necessary to change the cut-out blocks. These all come equipped with screws or with holes for screws or bolts for fastening them in the box. These blocks on which the fuses are mounted are of varying span or length, depending partly on the size of fuse which they are to carry. Also, they come in different multiples, carrying one, two, three or more fuses. From time to time, as pointed out, it is necessary to put a two fuse block in place of a one fuse block. These blocks are provided with screws or screw holes for fastening them in the box, but in the past when they were changed it has been necessary to punch new holes. The further object of the present invention is to dispense with the necessity for this. To this end I have provided one or more pairs of parallel slotted members spaced apart a little more than the length of the longest cut-out blocks, the slots in these bars being in the direction of their length, the slots in the two members being parallel and opposite. Coöperating with these slotted members are transversely extending slotted plates or strips fastened at their ends by screws or bolts, the bolts at each end of any such strip or plate engaging the corresponding slots of the first-mentioned parallel slotted members. The slots in the transverse members extend in the direction of the length of these members, that is, at right angles to the slots in the first-mentioned slotted members, and the fuse blocks or cut-outs, as they are called in the trade, which are porcelain blocks provided with binding screws for the connection of the wires and contact clamps to engage the fuses are secured to the slots in the transverse members, that is, the blocks are provided with screw-holes by which they are to be fastened to their supports and screws or bolts are passed through these holes and through the slots in the transverse members.

The advantage of this construction is that whatever the arrangement of the screw-holes in the porcelain blocks which of course cannot be changed, the screws which are passed through these holes can be made to engage and pass through the slots of the transverse members. Further slots in these members are sufficiently elongated to accommodate themselves to any corresponding dimension as to the arrangement of the screws, and these transverse members are adjustable at right angles for their length in the slots of the aforementioned main slotted bars so that they can be adjusted to any transverse relation of the screw-holes in the porcelain blocks. While the word "porcelain" has been used in connection with these fuse blocks or fuse cut-outs as they are termed in the trade, they may of course be made of any convenient insulating material.

In the accompanying drawing I have illustrated a wall box or safety cabinet embodying the features of my invention.

Figure 1 is a view which with the box in position on the wall would be an elevation. In this view the doors are broken away to show the inside or back of the box so as to disclose the supporting device for the cut-out or switch blocks.

Fig. 2 is a top plan.

Fig. 3 is a bottom plan.

Fig. 4 is a sectional elevation on the line 4, 4 of Fig. 1.

Referring to the drawings by numerals, the box as shown, which construction is not essential to the other features of the invention, is of sheet metal which is substantially U-shaped in horizontal cross-section, that is, the back 1 and the sides 2 and 3 are of a single sheet which as shown is flanged or turned in at the front vertical edges, the flange being indicated by reference character 4. The back and sides 1, 2 and 3 are also flanged or turned at right angles at their top and bottom edges at 5, the top and bottom flanges 5 being preferably mitered or suitably arranged at the corners. As shown there is also a strip 6 of L-shaped cross-section extending across the front of the box at the top and bottom, the same being in the construction shown fastened by rivets 7 at each end to the corresponding top or bottom ends of the front flanges 4. The doors 8 as illustrated are swung from the corners of the box by means of suitable hinges 9. These doors have flanges 10 at the top and bottom which take over the corresponding top and bottom edges of the box, and at the meeting edge of the doors which are double and swing outward, on one side there is an L-shaped flange 11 and on the other side a straight flange 12, the L-shaped flange being intended to lie inside when the doors are closed.

The important feature of the box is the sectional construction at the top and bottom as illustrated and already pointed out in the preamble. These walls which might be otherwise located are built up of a series of plates or separate members 14 which in the form of the invention shown fit inside the top and bottom flanges, being secured by any suitable removable fastening means as screws 15.

In accordance with the object of the invention, as expressed in the preamble, the conduit holes 16 in these plates are of various sizes, the object being to make the plates interchangeable so that they may be selected and changed to correspond to the desired and necessary sizes of the conduits or pipes 17 containing the wires. In Figs. 1 and 2, I have shown the pipes, 17, with nuts, 18, inside and outside to secure the pipes or bushings to the openings or to the portions of the wall bordering the openings. At 19 I have shown blank plates as the number of conduits leading to the box is of course variable and the box must be completely closed when in use. If it is desired to increase the number of conduits, the blank plates may be bored or substituted by plates having openings of the necessary size. At 20 and 21 I have shown a conduit in a suitable position for the mains entering and leaving the box, the conduits or pipes 17, 18, etc., being ordinarily for branch wires.

As a means for supporting cut-outs or fuse blocks I have shown main supports in the form of Z-bars 25 suitably secured to the back of the box and parallel to the top and bottom. These may be in sets of any desired number and arrangement. One flange 26 of each bar is riveted or otherwise conveniently secured to the back of the box, the other flange 27 being pierced by elongated slots or openings in elongated arrangement 28 parallel to the top and bottom of the box and to the length of the bars. These openings 28 are similarly arranged and parallel in the two bars, and preferably opposite or co-extensive. Coöperating with the main supporting members 25 are transverse plates or strips 31 having elongated slots or openings in elongated arrangement 32 at right angles to openings 28. These plates or bars 31 are secured to the main supports 25 by means of screws or bolts 29 seated in the openings 28. Therefore the strips or plates 31 are adjustable in the direction of the length or elongation of openings 28, that is, at right angles to the length of these plates to accommodate themselves to any desired arrangement of the fuse blocks or cut-out blocks 33 which are fastened thereto by means of screws 34 in the openings 32. The elongation of slots 32 and the transverse adjustment of the plates 31 by means of openings 28 provides for or accommodates any arrangement of the screw-holes 35 in the porcelain or similar cut-out blocks 33, making the cutting or boring of a series of holes in the metallic cabinet wholly unnecessary, thereby achieving a very large saving of time and labor in addition to the advantage incident to dispensing with the boring or cutting of holes in the box and the like.

The circuit shown in addition to the features of the invention described includes mains 40, 41, 42 entering the box by way of conduit 20 and leaving it by way of conduit 21. To these mains are joined the branch wires 43, 44, 45 in which are inserted fuses 46 mounted in fuse blocks 33. These branch wires leave the box by way of conduits 17 and 18 connected to corresponding conduit openings in the removable sections or plates 14. The functions, advantages and manner of utilizing the apparatus have been fully set forth.

I have thus described specifically and in detail an apparatus embodying my invention in the form which is considered the preferred form; however, the specific terms herein are used descriptively and not in a limiting sense, the scope of the invention being defined in the claims.

What I claim and desire to secure by Letters Patent is:

1. A cut-out box, having main supports for cut-out blocks in said box in the form of a plurality of flanged bars which are substantially parallel to each other, one flange of each bar being secured to the box, the other flange being slotted in the direction of the length of the bar, transverse members secured at their ends in said slots, said transverse members having slots extending transversely to the arrangement of the first-mentioned slots, whereby a variety of cut-out blocks, having fastening means of different spacing, may be secured in the box by adjusting said transverse members to receive them.

2. In a cut-out box, parallel Z-bars each having one flange secured to the box, the other flange being provided with fastening slots in elongated arrangement and transverse strips adjustably secured to said slots, the transverse strips having fastening slots in elongated arrangement to receive fastening means for cut-out blocks.

Signed by me at Baltimore, Maryland, this 29 day of May, 1919.

HECTOR H. BROWN

Witnesses:
ZELLA KUHN,
EMMA WEHMEYER.